US012777094B2

(12) United States Patent
Sterbling et al.

(10) Patent No.: US 12,777,094 B2
(45) Date of Patent: Oct. 27, 2026

(54) ENHANCED EDGE DEVICE COMPUTING ENVIRONMENT HAVING EDGE NODE AGENT

(71) Applicant: SAP SE, Walldorf (DE)

(72) Inventors: Sven Sterbling, Heidelberg (DE); Joachim Goennheimer, Walldorf (DE)

(73) Assignee: SAP SE, Walldorf (DE)

( * ) Notice: Subject to any disclaimer, the term of this patent is extended or adjusted under 35 U.S.C. 154(b) by 153 days.

(21) Appl. No.: 18/510,530

(22) Filed: Nov. 15, 2023

(65) Prior Publication Data

US 2025/0159045 A1 May 15, 2025

(51) Int. Cl.

| | |
|---|---|
| ***H04L 12/24*** | (2006.01) |
| ***G06F 9/50*** | (2006.01) |
| ***G06F 16/215*** | (2019.01) |
| ***H04L 41/0803*** | (2022.01) |
| ***H04L 67/12*** | (2022.01) |
| ***H04L 67/289*** | (2022.01) |
| ***H04L 67/56*** | (2022.01) |

(52) U.S. Cl.

CPC ............ *H04L 67/12* (2013.01); *G06F 9/5027* (2013.01); *G06F 16/215* (2019.01); *H04L 67/289* (2013.01); *H04L 67/56* (2022.05)

(58) Field of Classification Search

CPC ....... H04L 67/12; H04L 67/289; H04L 67/56; G06F 16/215

USPC .......................................................... 709/201

See application file for complete search history.

(56) References Cited

U.S. PATENT DOCUMENTS

| | | | | |
|---|---|---|---|---|
| 2011/0055481 | A1 * | 3/2011 | Murakami | G06F 12/0875 711/E12.001 |
| 2019/0075080 | A1 * | 3/2019 | Entezari | H04L 63/061 |
| 2021/0210217 | A1 * | 7/2021 | Xu | H04L 41/0604 |
| 2021/0241926 | A1 * | 8/2021 | Chor | H04W 4/70 |
| 2022/0284330 | A1 * | 9/2022 | Ambrus | G06N 7/01 |

(Continued)

FOREIGN PATENT DOCUMENTS

| | | |
|---|---|---|
| EP | 2982133 | 8/2017 |

OTHER PUBLICATIONS

Extended European Search Report received in European Application No. 24206116.3, Mar. 25, 2025, 13 pages.

(Continued)

*Primary Examiner* — Ario Etienne
*Assistant Examiner* — Elizabeth Kassa
(74) *Attorney, Agent, or Firm* — Klarquist Sparkman, LLP

(57) ABSTRACT

Edge devices can provide large amounts of data, only some of which may be relevant to a downstream system. In addition, edge device data may need to be processed, including being enriched with additional data, before being used by the downstream system. Disclosed techniques provide an edge agent that receives edge device data, including sensor data. The edge agent performs processing on the edge device data, which can include operations such as filtering and aggregation, as well as enriching the edge device data with values for attributes in addition to attributes and associated values that are present in edge device data sent from the edge device to the edge agent. The use of the edge agent and its associated actions can reduce a data volume sent to the downstream system, as well as making the edge device data more immediately useable by the downstream system.

20 Claims, 12 Drawing Sheets

(56) References Cited

U.S. PATENT DOCUMENTS

| | | | | |
|---|---|---|---|---|
| 2023/0088415 | A1* | 3/2023 | Friedlander | G06F 21/577<br>726/23 |
| 2024/0281648 | A1* | 8/2024 | Ganesan | G06N 5/022 |
| 2024/0401460 | A1* | 12/2024 | Gupta | E21B 44/02 |

OTHER PUBLICATIONS

Zalhan et al., "Towards a Semantic Edge Processing of Sensor Data. An Incipient Experiment," Sep. 17, 2020, Springer, pp. 75-79, XP 047584748.

* cited by examiner

400

```
class PumpData {
  constructor(deviceId, latitude, longitude, flowRateValue, temperatureValue) {
    this.deviceId = deviceId;
    this.timestamp = new Date().toISOString();
    this.location = {
      latitude: latitude,
      longitude: longitude,
      description: 'Default location'
    };
    this.data = {
      flowRate: {
        value: flowRateValue,
        unit: 'L/s',
        status: 'Normal'
      },
      temperature: {
        value: temperatureValue,
        unit: '°C',
        status: 'Normal'
      }
    };
    this.operationalStatus = 'Operational';
    this.batteryLevel = 100;
    this.alerts = [];
  }

  addAlert(code, description) {
    this.alerts.push({ code, description });
  }

  toJSON() {
    return {
      deviceId: this.deviceId,
      timestamp: this.timestamp,
      location: this.location,
      data: this.data,
      operationalStatus: this.operationalStatus,
      batteryLevel: this.batteryLevel,
      alerts: this.alerts
    };
  }
}

// Example usage:
const pump = new PumpData('pump123', 40.7128, -74.0060, 12.5, 23.4);
pump.addAlert('A01', 'Low Battery');
const pumpJSON = JSON.stringify(pump);
console.log(pumpJSON);
```

FIG. 4

500

```
# Data Cleansing: Handle Missing or Erroneous Data
def cleanse_data(data):
   # Calculate average flow rate for each pump
   total_flow = {}
   count_flow = {}
   for entry in data:
      if entry["flow_rate"] is not None:
         total_flow[entry["pump_id"]] = total_flow.get(entry["pump_id"], 0) +
entry["flow_rate"]
         count_flow[entry["pump_id"]] = count_flow.get(entry["pump_id"], 0) + 1

   avg_flow = {pump: total_flow[pump] / count_flow[pump] for pump in total_flow}

   # Replace None values with average flow rate of the pump
   for entry in data:
      if entry["flow_rate"] is None:
         entry["flow_rate"] = avg_flow[entry["pump_id"]]

   return data

pump_data = cleanse_data(pump_data)

# Aggregation: Calculate Average Temperature for a Single Pump (PumpA)
def avg_temperature(data, pump_id):
   total_temp = sum(entry["temperature"] for entry in data if entry["pump_id"] ==
pump_id)
   count = sum(1 for entry in data if entry["pump_id"] == pump_id)
   return total_temp / count

average_temp_pumpA = avg_temperature(pump_data, "PumpA")
print(f"Average temperature for PumpA: {average_temp_pumpA:.2f}°F")

# Filtering: Get Data Entries for a Single Pump (PumpA)
def filter_by_pump(data, pump_id):
   return [entry for entry in data if entry["pump_id"] == pump_id]

pumpA_data = filter_by_pump(pump_data, "PumpA")
print(pumpA_data)
```

FIG. 5

600

```
{
  "pumpDetails": {                                   620
    "pumpID": "PUMP12345",
    "location": "Factory Floor A",                   624
    "installationDate": "2021-01-15",
    "manufacturer": "PumpTech Co.",
    "model": "PT-200",
    "maintenanceSchedule": "Bi-annually",
    "lastMaintenanceDate": "2021-07-01",
    "expectedLifetime": 10,
    "responsiblePerson": "John Doe"
  },
  "sensorDetails": {
    "sensorID": "SENSOR67890",
    "sensorType": "Flow Rate",                       628
    "measurementUnit": "L/min",
    "manufacturer": "SensorTech Ltd.",
    "model": "ST-FR10",
    "installationDate": "2021-01-16",
    "accuracyRange": "±2%",
    "calibrationSchedule": "Annually",
    "lastCalibrationDate": "2021-06-01"
  },
  "governance": {
    "dataOwner": "Factory Operations",               632
    "dataSteward": "Jane Smith",
    "dataAccess": "Factory Analytics Team",
    "dataQualityFlags": "Valid"
  },
  "readings": {                                      612
    "timestamp": "2023-10-19T15:30:00Z",
    "value": 45.2
  }                                                  614
}
```

FIG. 6

```
CREATE TABLE Pumps (
   pumpID TEXT PRIMARY KEY,
   location TEXT,
   installationDate DATE,
   manufacturer TEXT,
   model TEXT,
   maintenanceSchedule TEXT,
   lastMaintenanceDate DATE,
   expectedLifetime INTEGER,
   responsiblePerson TEXT
);
```

710

```
CREATE TABLE Sensors (
   sensorID TEXT PRIMARY KEY,
   pumpID TEXT,
   sensorType TEXT,
   measurementUnit TEXT,
   manufacturer TEXT,
   model TEXT,
   installationDate DATE,
   accuracyRange TEXT,
   calibrationSchedule TEXT,
   lastCalibrationDate DATE
);
```

720

```
CREATE TABLE Governance (
   pumpID TEXT PRIMARY KEY,
   dataOwner TEXT,
   dataSteward TEXT,
   dataAccess TEXT,
   dataQualityFlags TEXT
);
```

730

```
SELECT * FROM Pumps WHERE pumpID = 'PUMP12345';
SELECT * FROM Sensors WHERE sensorID =
'SENSOR67890';
SELECT * FROM Governance WHERE pumpID =
'PUMP12345';
```

740

FIG. 7

800

```
# Construct the JSON object
combined_data = {
    "pumpDetails": dict(zip([desc[0] for desc in cursor.description],
pump_data)),
    "sensorDetails": dict(zip([desc[0] for desc in cursor.description],
sensor_data)),
    "governance": dict(zip([desc[0] for desc in cursor.description],
governance_data)),
    "readings": processed_data
}

# Convert to JSON string
json_data = json.dumps(combined_data, indent=4)

print(json_data)
```

FIG. 8

900

```
import erp_connector as erp
import data_fabric_connector as dfc

# Step 1: Extraction from ERP system

# Connect to the ERP system
erp_connection = erp.connect("erp_endpoint", "username", "password")

# Extract pump master data
pump_master_data = erp_connection.get_table_data("PumpMasterData")

# Extract sensor governance data
sensor_governance_data = erp_connection.get_table_data("SensorGovernanceData")

# Close the ERP connection
erp_connection.close()

# Step 2: Transformation

# For the purpose of this example, it is assumed that the data from the ERP system is
already
# in a format compatible with the data fabric, so no major transformation is needed.
# However, if transformations were needed, relevant operations on the
# pump_master_data and sensor_governance_data objects can be defined here.

# Step 3: Loading into Data Fabric

# Connect to the data fabric
df_connection = dfc.connect("data_fabric_endpoint", "df_username", "df_password")

# Load the pump master data
df_connection.load_data(pump_master_data, target_table="PumpMasterDataFabric")

# Load the sensor governance data
df_connection.load_data(sensor_governance_data,
target_table="SensorGovernanceDataFabric")

# Close the data fabric connection
df_connection.close()
```

FIG. 9

ENHANCED EDGE DEVICE COMPUTING ENVIRONMENT HAVING EDGE NODE AGENT

FIELD

The present disclosure generally relates to processing data from edge devices.

BACKGROUND

Computing devices are becoming ever more ubiquitous, including having network enabled functionality in, or otherwise associated with, devices that are not normally considered to be "computing devices." As an example, edge devices are seeing increased use. As the term is used in the present disclosure, an edge device is a computing device that is positioned in proximity to data sources, often at the periphery of a network or system, where data is sent from the edge device to a downstream component for further processing. In particular, the present disclosure considers edge devices as having sensors, which can encompass sensors that detect environmental phenomena, such as temperature or humidity, or can track various operational parameters, including the movement of machine components or the activation of buttons by users as part of machine operation.

Edge devices are often designed to perform at least limited data processing, storage, or control functions locally, providing real-time or near-real-time data insights, reducing latency, and enhancing the efficiency of data transmission. Examples of edge devices include smart sensors in industrial machinery, autonomous vehicles, smart home devices like thermostats, and security cameras.

Data from edge devices is often collected and processed as more central locations—computing devices that have a more "central" location as opposed to the edge devices at the periphery. That is, multiple edge devices can send data to a common downstream computing device, which can then perform operations on data for particular edge devices, as well as for sets of edge devices. Given the vast volume of data that can exist, it can be quite resource intensive to collect and process such data. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Edge devices can provide large amounts of data, only some of which may be relevant to a downstream system. In addition, edge device data may need to be processed, including being enriched with additional data, before being used by the downstream system. Disclosed techniques provide an edge agent that receives edge device data, including sensor data. The edge agent performs processing on the edge device data, which can include operations such as filtering and aggregation, as well as enriching the edge device data with values for attributes in addition to attributes and associated values that are present in edge device data sent from the edge device to the edge agent. The use of the edge agent and its associated actions can reduce a data volume sent to the downstream system, as well as making the edge device data more immediately useable by the downstream system.

In one aspect, the present disclosure provides a process of processing data from edge devices by an edge agent prior to forwarding processed edged device data to a downstream computing system. The edge agent receives data from a plurality of edge devices. The data for a given edge device of the plurality of edge devices includes at least one reading from at least one hardware sensor in communication with the given edge device and an edge device identifier for the given edge device or a sensor identifier of a sensor associated with the given edge device.

For respective data for respective edge devices of the plurality of edge devices, at least one respective data processing rule is identified that performs at least one data enrichment or data processing operation using a respective edge device identifier or a respective sensor identifier for a respective edge device. The respective data for the respective edge devices is processed to provide processed edge device data. The processed edge device data is sent to a downstream computing system.

The present disclosure also includes computing systems and tangible, non-transitory computer-readable storage media configured to carry out, or includes instructions for carrying out an above-described method. As described herein, a variety of other features and advantages can be incorporated into the technologies as desired.

BRIEF DESCRIPTION OF THE DRAWINGS

FIG. 4 is example Python code for creating a JSON object that includes data from an edge device associated with a pump.

FIG. 5 is example Python code for performing various data cleansing and aggregation operations using data from pump edge devices.

FIG. 6 is an example JSON object that includes pump sensor data as well as master data and governance data for the pump and sensor.

FIG. 7 provides example table definitions for storing pump and sensor master data and governance data, as well as queries that can be used to retrieve relevant information for a given pump identifier.

FIG. 8 provides example code for combining sensor data, master data, and governance data in a JSON object.

FIG. 9 provides example code for an ETL process that imports into a data fabric master data and governance data from an ERP system.

DETAILED DESCRIPTION

Example 1—Overview

Figure 1:
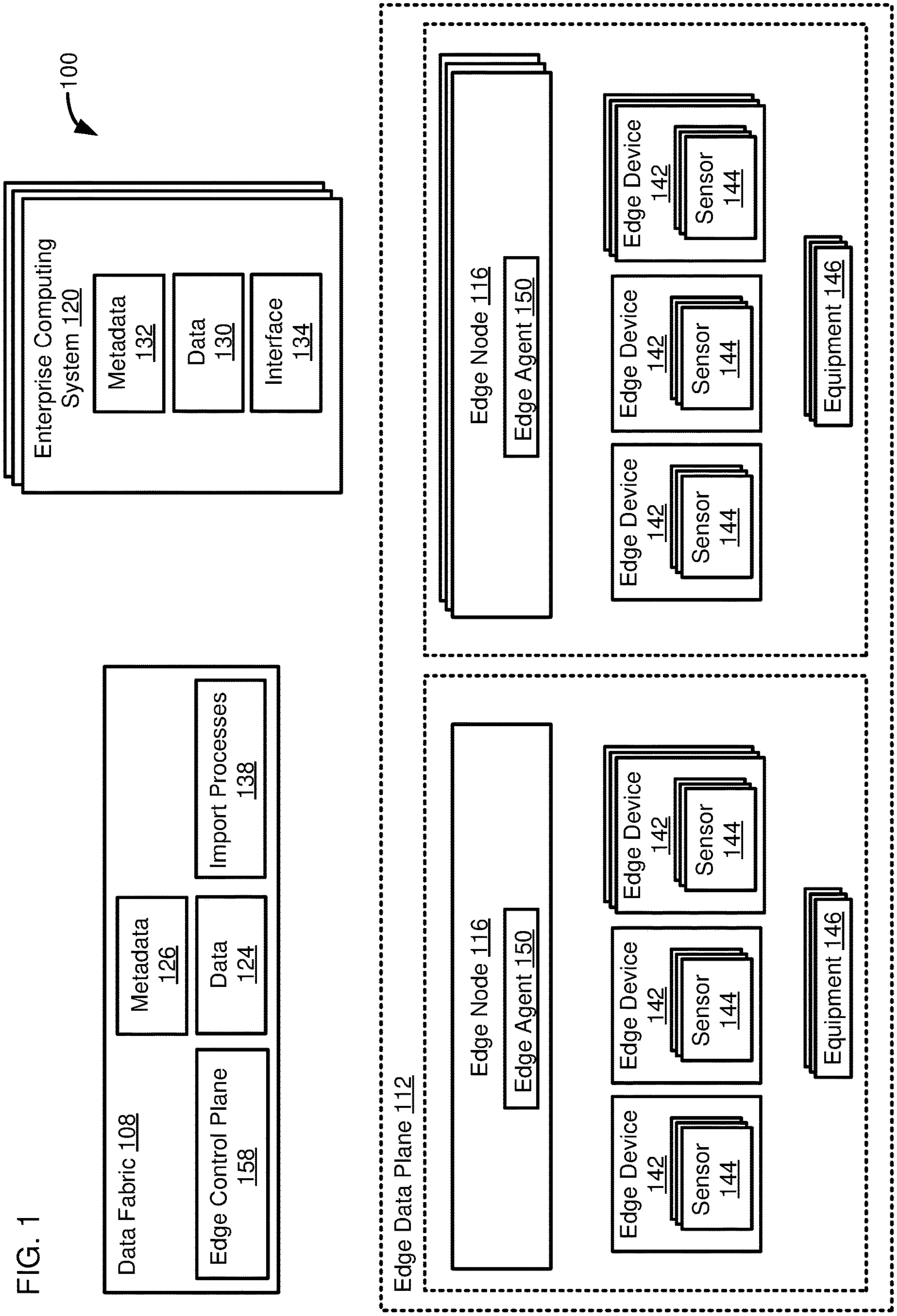
FIG. 1 is a diagram of an example computing environment in which disclosed techniques can be implemented, having an edge agent that is in communication with one or more edge devices, one or more enterprise computing systems, and a data fabric.

Computing devices are becoming ever more ubiquitous, including having network enabled functionality in, or otherwise associated with, devices that are not normally considered to be "computing devices." As an example, edge devices are seeing increased use. As the term is used in the present disclosure, an edge device is a computing device that is positioned in proximity to data sources, often at the periphery of a network or system, where data is sent from the edge device to a downstream component for further processing. In particular, the present disclosure considers edge devices as having sensors, which can encompass sensors that detect environmental phenomena, such as temperature or humidity, or can track various operational parameters, including the movement of machine components or the activation of buttons by users as part of machine operation.

Edge devices are often designed to perform at least limited data processing, storage, or control functions locally, providing real-time or near-real-time data insights, reducing latency, and enhancing the efficiency of data transmission. Examples of edge devices include smart sensors in industrial machinery, autonomous vehicles, smart home devices like thermostats, and security cameras.

Data from edge devices is often collected and processed as more central locations—computing devices that have a more "central" location as opposed to the edge devices at the periphery. That is, multiple edge devices can send data to a common downstream computing device, which can then perform operations on data for particular edge devices, as well as for sets of edge devices. Given the vast volume of data that can exist, it can be quite resource intensive to collect and process such data. Accordingly, room for improvement exists.

Disclosed techniques can help address these issues. For example, disclosed techniques introduce edge agents located at edge nodes, where an edge node is not a most central data collection point, but is more central than peripheral edge devices. Edge nodes can receive data from many edge devices. In some cases, edge nodes are located at physically relevant environments. As an example, an overall edge data plane may be defined for a particular location, such as a business campus. Different buildings on the campus can have machinery associated with edge devices, and each building can include an edge node to collect data from the edge devices. The edge node can then forward the edge device data to a more central computing point. In another example, a building may have multiple production lines, and different edge nodes can be associated with different sets of edge devices associated with the different production lines.

One issue that can arise in these scenarios is that more data may be processed and sent than is needed for a particular purpose. As a simple example, a process, such as a business process, may only need aggregated data. While the central computing point can perform the data aggregation, significant resources are consumed in processing the data, such as by an edge node, and sending the data from the edge node to the central computing point. Disclosed techniques allow for a data volume to be reduced prior to sending data originating from edge devices, or derived from such data, to the central computing point, saving computing resources. The data reduction can take various forms, such as performing data filtering or cleansing operations or performing aggregations.

In some scenarios, data from multiple sources can be combined for processing. For example, data from enterprise computing systems may be combined with data from edge devices for further processing. The data from the enterprise computing systems, such as an ERP (enterprise resource planning) or HR (human resources) applications, can be combined and processed at a computing system that is separate from the edge devices or edge nodes and the enterprise computing system. In particular, the data can be combined at a system providing a data fabric.

In some cases, a data fabric serves to facilitate the exchange of data between different computing systems. However, a data fabric can also itself combine, store, and process data from multiple sources. The central computing system can receive data from enterprise computing systems, and this data can be processed along with data sent from edge devices.

However, rather than processing "raw" data, such as sensor data, from edge devices, the central computing system can receive data that is already enriched with information from enterprise systems, allowing the data to be more easily processed at the central computing system, including along with other data received from one or more enterprise computing systems. Annotation rules can be defined to enrich data for edge devices at an agent of an edge node, where data used for enrichment can differ by edge node or by edge device.

Enrichment data can be stored on edge nodes and used to enrich data from edge devices when it is received. Enterprise computing systems can directly provide enriched data to the edge nodes. In other scenarios, an edge node can dynamically retrieve data from enterprise computing systems to be used for data enrichment. In a further scenario, enrichment data can be periodically updated from an enterprise computing system and cached for use at the edge node for a period of time.

Example 2—Example Computing Environment with Edge Agent

FIG. 1 illustrates a computing environment 100 in which disclosed techniques can be implemented. Generally, the computing environment 100 includes a data fabric 108, an edge data plane 112 that includes one or more edge nodes 116, and one or more enterprise computing systems 120.

The data fabric 108 includes data 124 and metadata 126. The metadata 126 can correspond to definitions of data objects that are used to store the data 124. For example, the data objects can represent database tables or views, or can correspond to JSON objects. Data 124 can correspond to values for particular instances of the data objects. For example, a table can be instantiated that has a definition specified in the metadata, and can have records/rows that have values that correspond to the data 124 for an instance represented by the record/row.

The data 124 and optionally the metadata 126 can correspond to data 130 or metadata 132 originating at, or derived at least in part from, the enterprise computing systems 120. The data 130 and metadata 132 can be obtained using import processes 138, such as an ETL (extract transform load) process. The import processes 138 can include operations such as filtering data 130 or metadata 132 or transforming the data or metadata.

Communications between the data fabric 108, or edge agents 150, can occur using an interface 134 of a given enterprise computing system 120. The interface 134 can be of any suitable type, including providing an application programming interface, which can be implemented in some cases using RESTful techniques. The interface 134 can be defined via information such as a host and a port, and can be configured to, along with a particular data request, receive authentication information, such as a username and password, prior to performing requested operations. Other types of authentication techniques include username and password, OAuth, Single Sign-On (SSO), certificate-based authentication, token-based authentication (such as JSON web tokens), passwordless authentication, and time-based One-Time Passwords (TOTP).

Transforming the data 130 can include performing aggregation or conversion operations, including to convert data between datatypes. Transforming the data 130 and metadata 132 can also include storing the data 130 in data objects of the data fabric 108 that have different data formats or data schemas. For example, data 130 can be stored in a JSON format instead of a relational format, or vice versa.

The metadata 126, 132 can define data objects, including particular attributes, such as table columns or key identifiers in a key-value pair storage system. Data objects of the data fabric 108 can include attributes that correspond to attributes defined in the metadata 132, but the attributes may not have the same organization as in the enterprise computing system 120. For example, attributes from different tables or views in the enterprise computing system 120 can be combined in a single data object of the data fabric 108. In some cases, data objects need to be strictly associated with metadata 126, 132. For example, JSON can be created that have a particular structure without being "instantiated" from such a structure as might be the case for relational database objects or, more generally, abstract or composite datatypes.

The data 124 can include data received from the edge nodes 116, and the metadata can define structures for storing such data. The edge nodes 116 can communicate with one or more edge devices 142. Each edge device 142 can have one or more sensors 144. In some scenarios, the sensors 144 can be associated with one or more pieces of equipment 146, such as manufacturing equipment or other types of equipment that is associated with sensors. For example, sensors 144 can be configured to measure operation of equipment 146, such as equipment in a manufacturing setting, but which can also include equipment in other commercial settings, or in non-commercial settings. Sensors 144 need not be associated with equipment 146, such as sensors that monitor a particular environment, such as for temperature or humidity.

Data received from the edge devices 142 can be received by an edge node 116. Rather than forwarding the data from the edge devices 142 directly to the data fabric 108, data can be processed at the edge node 116 by an edge agent 150. The operations of the edge agent 150 will be further described, but can include operations such as filtering data and aggregating data. The edge agent 150 can also be configured to collect data from edge devices 142 over a time period and periodically send batched data to the data fabric 108. In other scenarios, the edge agent 150 can process data from edge devices 142 as it is received and send the data to the data fabric as it is received, which can be on a near real-time basis.

In processing data from edge devices 142, the edge agent 150 can retrieve data from one or more of the enterprise computing systems 120. As an example, a particular edge device 142 can be associated with a particular identifier, and in at least some cases individual sensors 144 of the edge devices can be associated identifiers. When data is received from a particular edge device 142, the edge agent 150 can associate the edge device (or sensor thereof) with one or more particular processing rules. The processing rules can specify aggregating or filtering operations for data from an edge device 142.

The processing rules can also specify one or more enterprise computing systems 120 from which enrichment data should be received, as well as instructions as to how to retrieve the enrichment data and apply it to the data from the edge device 142. For example, a given edge device 142 can be associated with a particular query to be executed by an enterprise computing system 120. The query can be sent to the enterprise computing system 120, which processes the query and returns results to the edge agent 150. The edge agent 150 can then enrich the data from the edge device 142 with the query results, before forwarding the enriched data to the data fabric 108.

The data fabric 108 can include an edge control plane 158. The edge control plane 158 can be used to configure the edge agents 150, and in at least some implementations the edge devices 142 or the edge nodes 116. For example, the edge control plane 158 can be used to perform create, read, update, or delete operations with respect to the processing rules used by the edge agents 150. When the edge control plane 158 is used for configuring the edge nodes 116 or edge devices 142, the edge control plane can be used for operations such as associating particular edge devices with particular edge nodes, such as based on particular edge device types, sensor types, edge device or sensor identifiers, or using geolocation information. For example, configuration can include specifying that all edge devices 142 within a certain physical area should be assigned to a particular edge agent 150.

Although each edge node 116 is shown with a single edge agent 150, in other cases a single edge node can have multiple edge agents. The different edge agents 150 can be used to process data from different sets of edge devices 142 or sensors 144 thereof, where in at least some cases such data can be used by multiple edge agents.

Example 3—Example Edge Agent

Figure 2:
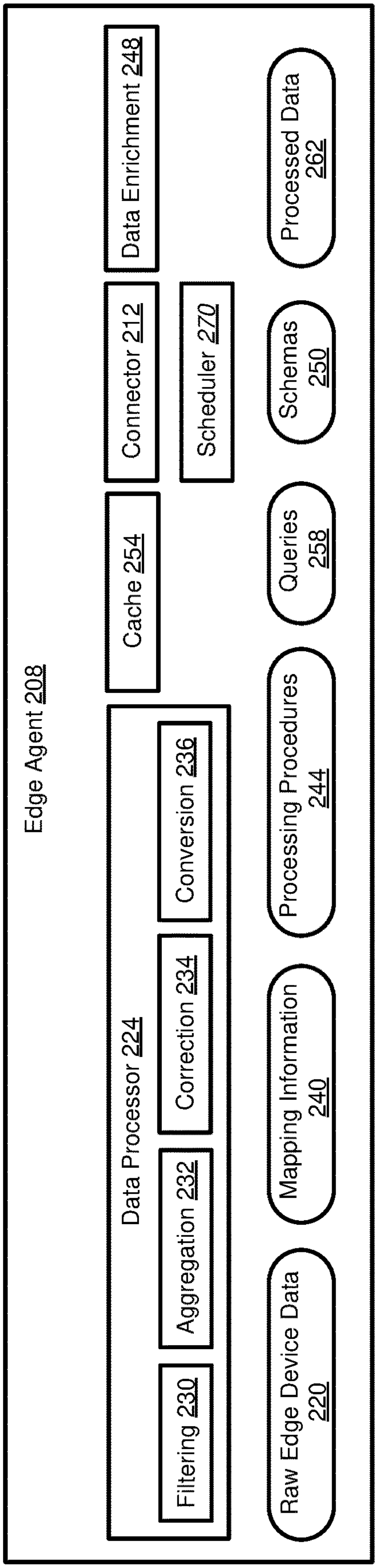
FIG. 2 is a diagram illustrating example components of an edge agent.

FIG. 2 is a diagram illustrating an edge agent 208, which can correspond to the edge agent 150 of FIG. 1 The edge agent 208 can include one or more connectors 212. The connectors 212 can be used to communicate with other components of an environment that processes data from edge devices, such as the components of the computing environment 100 of FIG. 1. For example, a connector 212 can perform operations such as receiving data from edge devices, sending data requests to and receiving data from enterprise computing systems, and sending data to a data fabric or other component.

The edge agent 208 can receive and store raw edge device data 220. Once edge device data is received, a data processor 224 can perform various operations on the data before sending the data, or data derived therefrom, to the data fabric or other component. The operations can include:

Null Value Handling:
- Remove data sets or particular data values thereof containing null or missing values.
- Impute missing values using techniques such as mean, median, or mode replacement, forward-fill, or backward-fill, especially for time series data.

Use predictive models to estimate and impute missing values based on other related data points.

Outlier Detection & Handling:

Use statistical methods, such as the Z-score or the IQR (Interquartile Range), to detect outliers.

Clip outliers to boundary values or transform them.

Remove detected outliers if they are deemed erroneous.

Noise Reduction:

Apply smoothing techniques, especially for time-series data, using methods like moving averages or exponential smoothing.

Consistency Checks:

Ensure that data adheres to a consistent format or standard.

Correct inconsistencies in categorical data, such as different capitalizations or typos.

Duplicate Removal:

Identify and eliminate duplicate records. This can be done based on certain key attributes or considering the entire data set.

Data Transformation:

Normalize or standardize values, especially if the data will be used for machine learning models.

Bucket or bin continuous data into categories, if appropriate.

Validity Checks:

Confirm that the data values adhere to predefined formats. For instance, check if date values are in a specific date format.

Confirm that data adheres to domain-specific constraints, e.g., temperature readings should be within a plausible range.

Error Corrections:

Replace erroneous values with a default value, a previous valid reading, or an interpolated value based on surrounding data points.

Perform threshold-based corrections. For instance, for sensors with a known range of valid readings, values that fall outside of predefined thresholds can be adjusted to the closest threshold value. As an example, if a temperature sensor should only read between −50° C. and 50° C., a reading of 60° C. can be adjusted to 50° C.

Smoothing algorithms can be applied to account for potential errors. For example, algorithms like moving averages can be used to smooth out abrupt changes in the readings that are not consistent with surrounding values. This can help mitigate short-term spikes or dips which might be erroneous.

Harmonization:

Data can be processed to use a standard unit. That is, edge devices from different manufacturers or even different models from the same manufacturer might record data in varying units. For instance, one temperature sensor might report in Celsius while another reports in Fahrenheit. Harmonization can include converting data into a standard unit of measurement, such as converting all temperature readings to Celsius.

Data harmonization can include timestamp alignment. Sensors can have different sampling rates or may be located in different time zones. Data harmonization can align data to a standardized timestamp format, providing readings that are synchronized to a single reference time, accounting for potential time zone differences.

Scale and precision adjustments can be performed as part of data harmonization. Some sensors might provide readings with high precision (e.g., up to five decimal places) while others might offer less precision. Harmonization can involve adjusting all readings to a consistent level of precision, potentially by rounding or truncating values.

Data harmonization can also include spatial calibration. If edge devices are providing spatial data, such as coordinates from GPS sensors, there might be variations due to different coordinate systems or datum references. Harmonization can provide that spatial data adheres to a standard reference system.

Harmonization can also be performed to account for sensor-specific baselines. Some sensors might have inherent offsets or biases. If these are known, harmonization can involve adjusting the readings from such sensors to ensure they are on par with other devices. For instance, if a pressure sensor is known to consistently read 5 units too high, its readings can be adjusted downwards by 5 units during the harmonization process.

Structural Corrections:

Confirm that data is in the desired structure or format, e.g., converting hierarchical data to a flat structure or vice versa.

Temporal Alignment:

For time-series data, confirm that data points are correctly sequenced in time.

Verification:

Use external sources or reference data to verify the accuracy of the data. For instance, check the accuracy of location data against a map or geospatial database.

In carrying out these kinds of operations, the data processor 224 can include various components, such as a filtering component 230, an aggregation component 232, a correction component 234, and a conversion component 236. The specific operations to be performed for a particular set of data for a particular edge device can be determined by the data processor 224 using mapping information 240. The mapping information 240 can be used, for example, by identifying a set of processing procedures 244 to be performed using an identifier for the edge device or a particular sensor of an edge device.

Data from edge devices, typically after performing any data processing by the data processor 224, can be enriched by an enrichment component 248 before being sent to a downstream system. Generally, enrichment involves adding additional attributes and attributes values to at last a portion of data from an edge device. The added attributes can correspond to governance data or master data, and can be used to facilitate processing at a destination or otherwise downstream system.

The mapping information 240 can also be used to map particular edge devices or sensors thereof to appropriate enrichment procedures, which can be part of the processing procedures 244, such as using an identifier of the edge device or sensor thereof. The mapping information 240 can identify particular schemas 250 to be used for storing sensor data with enrichment data, such as definitions of table structures, XML documents, or JSON objects. In some cases, enrichment data can be maintained in a cache 254 or other storage. The mapping information 240 can be used to directly retrieve enrichment data from the cache 254, or the mapping information can be mapped to a query of a set of queries 258 used for data enrichment.

In some cases, enrichment data can be retrieved dynamically when sensor data is being processed, and so the queries 258 can be sent to an enterprise computing system, such as using a connector 212, and results returned used for enrichment. A similar process may be used to update the cache 254.

Data from edges devices, after any processing or enrichment, can be stored as processed data 262, including as instances of objects defined by the schemas 250. The processed data 262 can then be sent to a downstream component, such as a data fabric, which can use a connector 212.

In some cases, processed data 262 can be sent in a "streaming" manner—where processed data is sent to a downstream component as soon as it is available. In other cases, processed data 262 can be sent according to a schedule used by a scheduler 270. The scheduler 270 can use interval-based schedules, such as sending data in batches every sixty seconds, five minutes, etc. Schedules used by the scheduler 270 can also include schedules based on a number of processed data objects/data sets or data volume of processed data 262.

Example 4—Example Processing of Edge Device Data by Edge Agent

Figure 3:
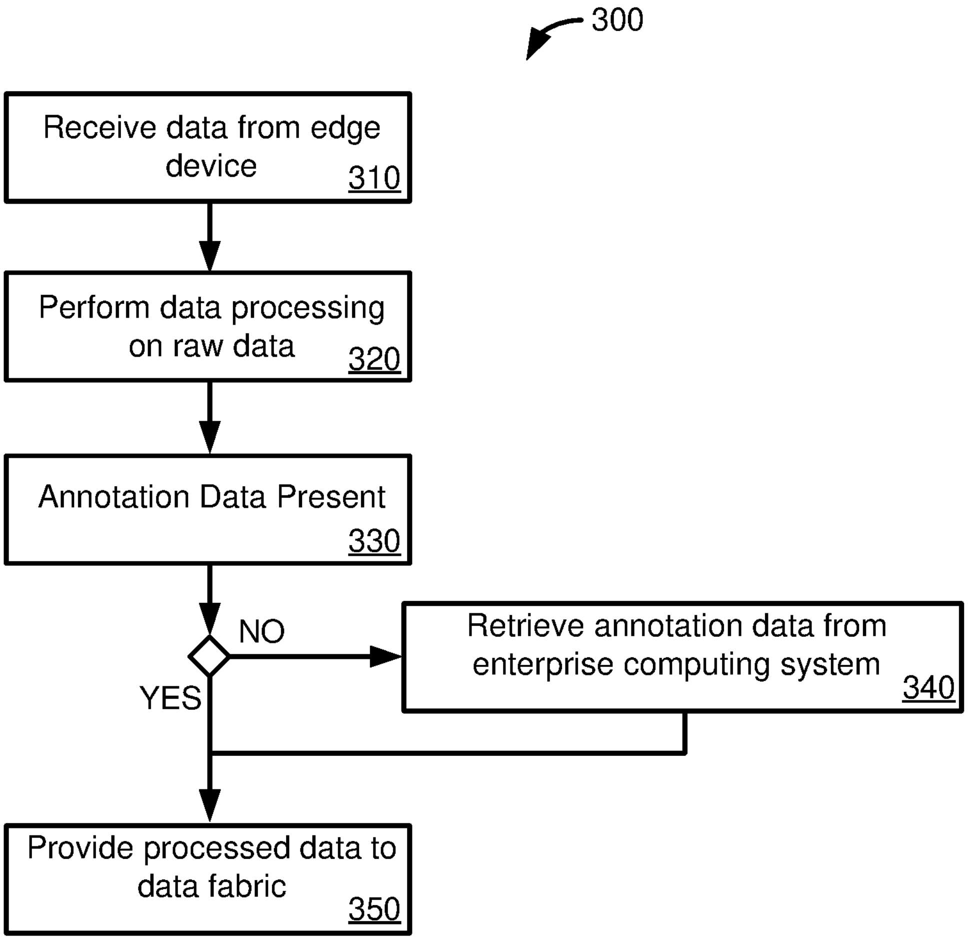
FIG. 3 is a flowchart of an example process of processing edge device data using an edge agent.

FIG. 3 is a flowchart of an example process 300 of receiving and processing data by an edge agent of an edge node for provision to a data fabric. Data is received from an edge device at 310. Edge devices, after gathering data from their associated sensors, initiate the data preparation process for transmission. This can include formatting the data into structured packets that are optimized for transfer. To help ensure the secure and efficient transfer of these packets, edge devices can use specific communication protocols, such as MQTT (Message Queuing Telemetry Transport) or CoAP (Constrained Application Protocol), that typically have low overhead and are suitable for environments with limited bandwidth. Encryption techniques are often applied to safeguard the transmitted information.

Edge devices, in some scenarios, can use wireless connections, facilitated by technologies like Wi-Fi or cellular networks. In proximity-based setups, Bluetooth or Zigbee can be used as connection methods, especially when power conservation is a priority.

The data is processed at 320. The data processing can include operations such as aggregation and filtering, including as part of data cleansing. Data cleansing can be used to help ensure the accuracy and reliability of the data from edge devices. Anomalies, such as outliers or noise, are identified and rectified, often using statistical methods or predefined thresholds to flag or remove suspicious values. Missing values can occur, and can be addressed using techniques like imputation, where gaps in the data are filled based on historical trends or adjacent data points.

Aggregation can be useful when the granularity of raw data exceeds the requirements of downstream applications. For instance, if a sensor transmits data every second, but an analytical application only requires a summary at minute intervals, the raw data can be aggregated into minute-level averages, sums, or other pertinent metrics. This not only reduces the data volume but also provides a clearer and more manageable view of patterns over time.

Filtering can be used for a variety of purposes, including allowing irrelevant or redundant data to be excluded from further processing. Filters can be based on certain criteria, like a predefined range of acceptable values, helping to provide that only meaningful data advances to the next stages. This can be especially useful in scenarios where devices might occasionally transmit system or status messages mixed with actual sensor readings.

Data transformation and normalization can also be performed as part of the operations at 320, especially when the data is to be used in conjunction with other datasets or systems. Transformation can help provide that data is in a consistent format or unit, while normalization scales the data to a standard range, which can be particularly useful when comparing or merging data from different sources.

Data processing at 320 can also include annotating edge device data, such as adding attribute values that can be used when the data is ingested into a data fabric. In one example, an identifier for a particular edge device, or a particular sensor of an edge device, can be used to determine what operations to perform at 320, which can include the operations described above or annotation operations. Annotating, also referred to as enriching, data can include associating values for a defined set of attributes for particular edge devices or sensors. In some cases, that can include associating specific values for a particular edge device or sensor, such as based on a particular class or type of edge device or sensor.

As will be described in greater detail, an example of a pump can be considered, where the pump includes a flow rate sensor and a temperature sensor. A set of attributes can be defined for pump data, which can include readings for flow rate and temperature, but can also include information such as location information or pump or sensor type. So, each pump, for example can have a location and type, but the particular location and the particular type of pump can vary among different pumps that serve as edge devices.

Some of the data used for enrichment can be present at an edge agent that performs the operations 320. The data can be initially provisioned to the agent, or can be retrieved, such as from an enterprise computing system, when data is to be processed. Both approaches can be used, such as when data is initially provisioned, and then updated during operation. In other cases, data can be retrieved when edge data is received for processing, such as by querying an enterprise computing system. Optionally, data can be cached for future use, and periodically the cache can be refreshed, such as when new edge data is received for processing and a threshold time period has passed. Data can also be retrieved from an enterprise computing system whenever edge device data is to be processed.

In the process 300, it is determined at 330 whether needed annotation data is present at the edge agent. If so, the data is annotated as part of the continued operations at 330. The processed data can then be provided to the data fabric at 350. If the needed annotation data is not present at the edge agent, the annotation data can be retrieved from an enterprise computing system at 340, the data annotated as part of the continued operations at 320, and then provided to the data fabric at 350.

In some cases, annotation data can be "pre-fetched" for use with a particular edge device. For example, when an edge device is registered with an edge agent, the edge agent can request appropriate data for use in enriching or annotating data for the edge device from one or more enterprise computing systems. The registration process can include defining what attributes are to be used in the enrichment process, information for connecting with an enterprise computing system (such as a host, port, username, or password), and information usable to retrieve values for the relevant attributes from an enterprise computing system. For example, the registration process can provide or identify a particular query, or other type of data request, to be sent to the enterprise computing system.

Values received from the enterprise computing system can then be cached for future use. The edge agent can periodically check for updated data values, including according to a defined schedule, or updated data values can be pushed from an enterprise computing system to an edge device when changes are made at the enterprise computing system to enrichment data.

The operations at 340 can include issuing a query or other data access request to an enterprise computing system. In one example, a predefined query is sent to an enterprise computing system for processing at 340. That is, a particular edge device or sensor thereof can be mapped to a query, where the query is executed when corresponding data is retrieved. In other cases, a query can be defined that can be used for multiple edge devices or sensors, such as defining a parameterized query, where the appropriate information for an edge device or sensors are provided as query parameters as part of a query execution request.

Querying an enterprise computing system can include direct SQL queries. However, Application Programming Interfaces (APIs) can also be used, such as RESTful APIs. In particular, RESTful APIs can be useful given their platform independence, security measures, and capability of transmitting structured data, often encapsulated in JSON format. SOAP (Simple Object Access Protocol), can also be used, providing structured information exchanges via web services.

In some scenarios, particularly when data is cached at an edge agent, rather than using a pull or request-response mechanism, push data update mechanisms can be used. For example, a data source can maintain a record of which edge agents are associated with particular edge devices, and particular attribute values that the edge agents use for such edge device. Data streaming platforms like Apache Kafka support the swift propagation of data changes across systems. However, data updates can be sent in other ways, such as by setting triggers on appropriate data sources and transmitting updated data to an edge agent when a relevant data change occurs.

Example 5—Example Use of Edge Agent to Process Pump Edge Device Data

Although disclosed techniques can be used in a variety of scenarios. The present disclosure provides example computer code and objects for a particular example scenario that illustrates the use of disclosed techniques. In particular, the example involves an industrial setup having a network of interconnected pumps. The pumps can include one or more edge devices, or can constitute edge devices, where the pumps include, or are associated with through an edge device, one or more sensors. In the particular example discussed, the sensors include a flow rate sensor and a temperature sensor.

The sensors can be used to maintain the health of the pump system, such as providing real-time monitoring capabilities that offer insights into the operational health, efficiency, and performance of each pump. Each pump is distinguished by a unique identifier, and individual pump sensors themselves can have particular identifiers. Typically, at least the pump identifier is transmitted along with sensor data.

As these sensors capture data, the information is structured by an edge device associated with the pump, or computing functionality embedded in the pump, for transmission and subsequent processing. In the example, the JSON format is used to send sensor data. Within this format, data is typically structured with overarching details about the pump, such as its unique identifier and a timestamp indicating when the data was captured. Nested within this, the sensor data is organized as an array. Each entry in this array corresponds to readings from a specific sensor, detailing the type of sensor, the captured value, and the unit of measurement. An example JSON schema for transmitting sensor data is:

```
{
  "$schema": "http://json-schema.org/draft-07/schema#",
  "title": "PumpData",
  "type": "object",
  "properties": {
    "deviceId": {
      "type": "string",
      "description": "A unique identifier for each pump."
    },
    "timestamp": {
      "type": "string",
      "format": "date-time",
      "description": "The exact date and time the data was collected."
    },
    "location": {
      "type": "object",
      "properties": {
        "latitude": {
          "type": "number"
        },
        "longitude": {
          "type": "number"
        },
        "description": {
          "type": "string"
        }
      },
      "required": ["latitude", "longitude", "description"]
    },
    "data": {
      "type": "object",
      "properties": {
```

-continued

```
        "flow rate": {
          "type": "object",
          "properties": {
            "value": {
              "type": "number"
            },
            "unit": {
              "type": "string"
            },
            "status": {
              "type": "string",
              "enum": ["Normal", "High", "Low"]
            }
          },
          "required": ["value", "unit", "status"]
        },
        "temperature": {
          "type": "object",
          "properties": {
            "value": {
              "type": "number"
            },
            "unit": {
              "type": "string"
            },
            "status": {
              "type": "string",
              "enum": ["Normal", "High", "Low"]
            }
          },
          "required": ["value", "unit", "status"]
        }
      },
      "required": ["flow rate", "temperature"]
    },
    "operationalStatus": {
      "type": "string",
      "enum": ["Operational", "Maintenance", "Offline"],
      "description": "Operational status of the pump."
    },
    "batteryLevel": {
      "type": "number",
      "minimum": 0,
      "maximum": 100
    },
    "alerts": {
      "type": "array",
      "items": {
        "type": "object",
        "properties": {
          "code": {
            "type": "string"
          },
          "description": {
            "type": "string"
          }
        },
        "required": ["code", "description"]
      }
    }
  },
  "required": ["deviceId", "timestamp", "location", "data", "operationalStatus",
"batteryLevel"]
}
```

For a specific set of pump data transmitted by the pump (or separate edge device in communication with the pump, or in physical proximity to the pump), a JSON object instance can be:

```
{
  "deviceId": "Pump12345",
  "timestamp": "2023-10-19T14:32:45Z",
  "data": {
    "flow rate": {
```

-continued

```
      "value": 125.4,
      "unit": "L/min"
    },
    "temperature": {
      "value": 32.5,
      "unit": "°C"
    }
  },
  "status": "Operational",
  "batteryLevel": 89.5,
```

-continued

```
    "signalStrength": "Good",
    "location": {
      "latitude": -34.603722,
      "longitude": -58.381592
    },
    "message": "Regular data update. No anomalies detected."
  }
```

In some cases, depending on the complexity of an edge device, an edge device can include programming to create instances of JSON objects. That is, the programming can act to "construct" object instances, and the code can directly create JSON objects rather than referring to an external schema. However, an external schema can still be useful. For example, an edge agent can use the schema to determine whether data from a pump is properly formatted, whether results are missing, or whether values are not consistent with the schema, such as if an attribute is intended to have a value from an enumerated list and the value in a particular JSON object is not part of the enumerated list.

FIG. 4 illustrates code 400 that can be used by an edge device to create a JSON object with particular sensor readings. In the code 400, a JavaScript class named PumpData is defined, which is intended to represent data from a pump edge device. The class is designed to construct instances of JSON objects that adhere to a predefined data structure, such as the structure provided above. The class constructor takes various parameters, including the device ID, latitude, longitude, flow rate value, and temperature value, to initialize the object's properties.

The PumpData class starts by setting default values for several properties, such as timestamp, location, data, operationalStatus, batteryLevel, and alerts. The data property contains nested objects for flow rate and temperature, each with their respective properties. The values for these attributes would be provided as arguments when the constructor is called.

Additionally, the code 400 includes a method called addAlert that allows for alert objects to be appended to the alerts array within the PumpData instance. Each alert object includes a code and a description, providing a mechanism for tracking and reporting alerts related to the pump.

To convert an instance of the PumpData class into a JSON-formatted string, a toJSON method is defined that returns an object with properties matching the JSON schema. This method enables a PumpData instance to be serialized into a JSON representation.

The example usage at the end of the code demonstrates how to create an instance of PumpData, add an alert to it, convert it to a JSON string using JSON.stringify, and log the resulting JSON object to the console. The resulting JSON object complies with the defined schema and represents the data collected from the pump device, including its location, operational status, battery level, and any associated alerts.

After the data from the pump is received by the edge agent, it can be processed, and then semantically enriched, including as described with respect to FIGS. 2 and 3. For the purposes of the discussion, consider the following four sets of pump data. The four sets of data corresponding to two separate readings from two separate pumps. The JSON structure is simplified as compared with the more detailed example provided above, where each object includes a pump identifier, a timestamp, a flow rate reading, and a temperature reading.

```
# Sample Data: List of Dictionaries
pump_data = [
  {
    "pump_id": "PumpA",
    "timestamp": "2023-10-01 12:01:00",
    "flow_rate": 10.5,
    "temperature": 65.4
  },
  {
    "pump_id": "PumpA",
    "timestamp": "2023-10-01 12:02:00",
    "flow_rate": 10.6,
    "temperature": 66.1
  },
  {
    "pump_id": "PumpB",
    "timestamp": "2023-10-01 12:01:00",
    "flow_rate": None,
    "temperature": 62.5
  },
  {
    "pump_id": "PumpB",
    "timestamp": "2023-10-01 12:02:00",
    "flow_rate": 9.8,
    "temperature": 62.8
  }
]
```

FIG. 5 provides example code 500 that can be used to perform various types of data processing on these sets of edge device data. The provided code performs three main functions, data cleansing, aggregation, and filtering, utilizing Python. The cleanse_data function addresses any missing or invalid data points tied to the flow rates of these pumps. The cleanse_data function includes two Python "dictionaries," total_flow and count_flow, which are initialized. These dictionaries accumulate the flow rate data and keep a count of these data entries for every individual pump. The function then loops over the dataset, which is structured as a list of dictionaries. Each dictionary represents a single data entry for a pump. When the function encounters a valid "flow_rate" value (i.e., it is not None), it adjusts the values in both the total_flow and count_flow dictionaries. The function computes the average flow rate for each pump, saving the results in the avg_flow dictionary.

The code 500 performs a subsequent iteration over the data, which enables the function to pinpoint entries with a "flow_rate" value of None. These are replaced with the previously calculated average flow rate for that specific pump, as fetched from the avg_flow dictionary.

Post-cleansing, the function returns the refined dataset, providing that missing or anomalous data points related to pump flow rates are handled appropriately.

The avg_temperature function aggregates temperature data. It computes the average temperature for a predefined pump (in this instance, "PumpA"). To achieve this, the function iterates over the data, summing up temperature readings specific to the given pump. Concurrently, the function also counts the number of such readings, enabling the calculation of the average temperature for the defined pump by taking the quotient of the total temperature and the count.

The function then outputs the computed average temperature for the designated pump, with this specific example presenting the average temperature for "PumpA" to two decimal places.

The filter_by_pump function deals with data filtering. The function is intended to isolate and retrieve data entries related to a specific pump, again exemplified by "PumpA". Using list comprehension in Python, the function sifts through the dataset. When it identifies an entry corresponding to the specified pump_id ("PumpA"), it appends it to a filtered list. The function then returns this list, providing a dataset specific to the designated pump.

Although the code 500 involves operations on data sets for individual pumps, data processing can include combining or comparing data from multiple pumps. For example, data from two pumps can, at least in some scenarios, be used to help account for missing data, to be used for cross-validation and detecting outlier values, to determine whether data is consistent (such as if two pumps are expected to produce similar data), to account for sensor drift, or, when data for the two pumps may later be analyzed together, to temporally align the data.

As described, including with respect to FIG. 2, edge device data can be enriched, as well as being processed for purposes such as aggregation or data cleansing. FIG. 6 illustrates an example JSON object instance 600 that includes flow rate sensor readings for a particular pump. The actual sensor data is shown as a timestamp 612 and a flow rate value 614 associated with the timestamp. It can be seen that this data has been significantly enriched as compared with the raw data from the edge device. The instance 600 includes the pump identifier 620, but includes a plurality of other attributes and associated values 624 describing the pump, including the location of the pump and information about a particular pump model and maintenance information for the pump. Similar attributes and values 628 are provided for the sensor. Data governance attributes 632 are also included, which can indicate an "owner" of the data, which can be used, for example, to determine who has access to the data, or whose permission is needed to modify the data.

The instance 600 can be constructed in a similar manner as an instance of pump data that is created by the code 500. The overall JSON structure of the instance 600 can be used with multiple pumps provided that flow rate information is captured by the edge device. Although the "readings" of the instance only provide flow rate, the JSON structure of the instance 600 can be modified to include multiple types of sensor readings, such as including both temperature and flow rate readings.

As has been described, data used for enrichment can be obtained by an edge agent from another component, such as from an enterprise computing system. FIG. 7 provides example table definitions that can represent tables stored on an enterprise computing system that include enrichment data used by the edge agent. In particular, FIG. 7 provides a definition 710 of a pumps table that provides pump master data, a definition 720 of a sensors table that includes sensor master data, and a definition 730 of a governance table that includes governance data.

FIG. 7 also illustrates queries 740 that can be used to obtain relevant master or governance data for particular edge devices and sensors thereof. These queries can optionally be sent from the edge agent to an enterprise computing system to be executed when edge device data is to be enriched. The tables created according to the definitions 710, 720, 730 can also represent information stored on the edge agent, including data previously retrieved from an enterprise computing system. Note that each query 740 includes a particular pump identifier as a selection criterion.

FIG. 8 provides code 800 that combines processed sensor data with enrichment data, such as enrichment data obtained using the queries 740 of FIG. 7. The code constructs a combined_data dictionary, which is structured to hold various categories of data. A pumpDetails section of the dictionary is constructed by merging column names from a database cursor with the corresponding data entries from the pump_data list. This creates a dictionary where each column name is paired with a specific pump data entry. Similarly, the sensorDetails key fuses the same column names with the sensor_data list, resulting in a dictionary that provides an organized representation of various sensor data points. The governance key, on the other hand, aligns the column names with the governance_data list, providing insights possibly related to the management or oversight aspects of the data.

The dictionary also has a readings key, which directly incorporates the processed_data list, representing a collection of readings. These could be from either pumps, sensors, or other devices.

Once the combined_data dictionary is fully constructed, the code uses Python's built-in json.dumps( ) method to convert it into a JSON string.

FIG. 9 provides example code 900 for extracting information, such as master data or governance data, from an enterprise computing system into a data fabric using an ETL process. The code 900 imports modules corresponding to an ERP connector and a data fabric connector, to facilitate the data extraction and loading processes. The first phase of the procedure is data extraction from the ERP system. The code initiates a connection to the ERP system by providing an endpoint, username, and password. Once connected, it retrieves two specific sets of data: pump master data and sensor governance data. These data sets are fetched from their respective tables in the ERP system, named "PumpMasterData" and "SensorGovernanceData". After extraction, the connection to the ERP system is terminated.

While the code mentions a potential transformation step, for this example, the data from the ERP system is already compatible with the data fabric. Thus, no major transformations are applied. However, if there were discrepancies in data formats or structures, this phase would involve adjustments to provide compatibility.

The third and final phase is the loading of data into the data fabric. The code 900 establishes a connection to the data fabric using the provided endpoint, username, and password. With the connection in place, the extracted pump master data is loaded into the "PumpMasterDataFabric" table of the data fabric. Similarly, the sensor governance data is loaded into the "SensorGovernanceDataFabric" table. The process concludes by closing the connection to the data fabric to ensure security and resource optimization.

Example 6—Example Processing of Sensor Data by Edge Agent

Figure 10:
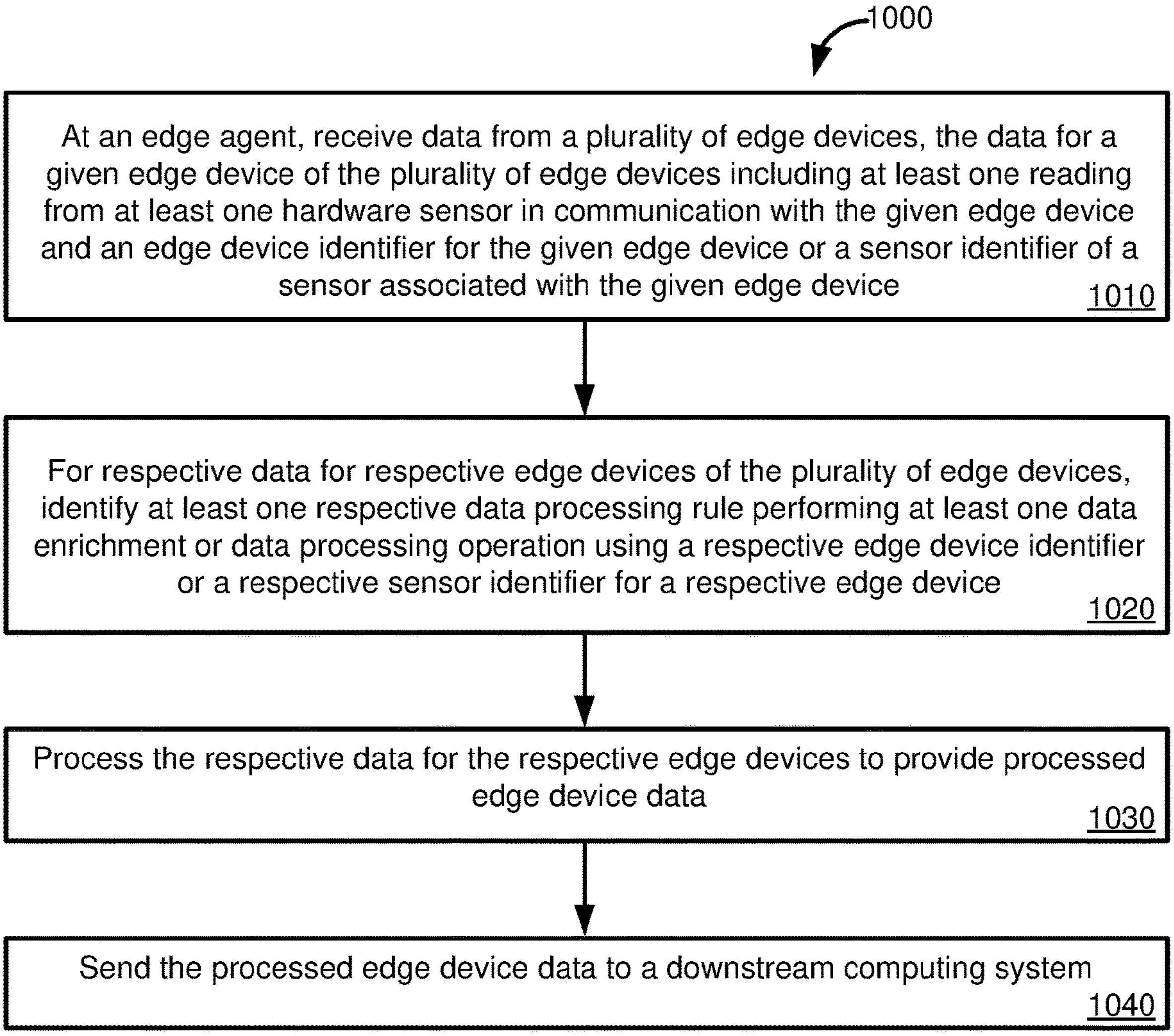
FIG. 10 is a flowchart of an example process of processing data from edge devices by an edge agent prior to forwarding processed edged device data to a downstream computing system.

FIG. 10 provides a flowchart of a process 1000 of processing data from edge devices by an edge agent prior to forwarding processed edged device data to a downstream computing system. At 1010, the edge agent receives data from a plurality of edge devices. The data for a given edge device of the plurality of edge devices includes at least one reading from at least one hardware sensor in communication with the given edge device and an edge device identifier for the given edge device or a sensor identifier of a sensor associated with the given edge device.

For respective data for respective edge devices of the plurality of edge devices, at 1020, at least one respective data processing rule is identified that performs at least one data enrichment or data processing operation using a respective edge device identifier or a respective sensor identifier for a respective edge device. At 1030, the respective data for the respective edge devices is processed to provide processed edge device data. The processed edge device data is sent to a downstream computing system at 1040.

Example 7—Computing Systems

Figure 11:
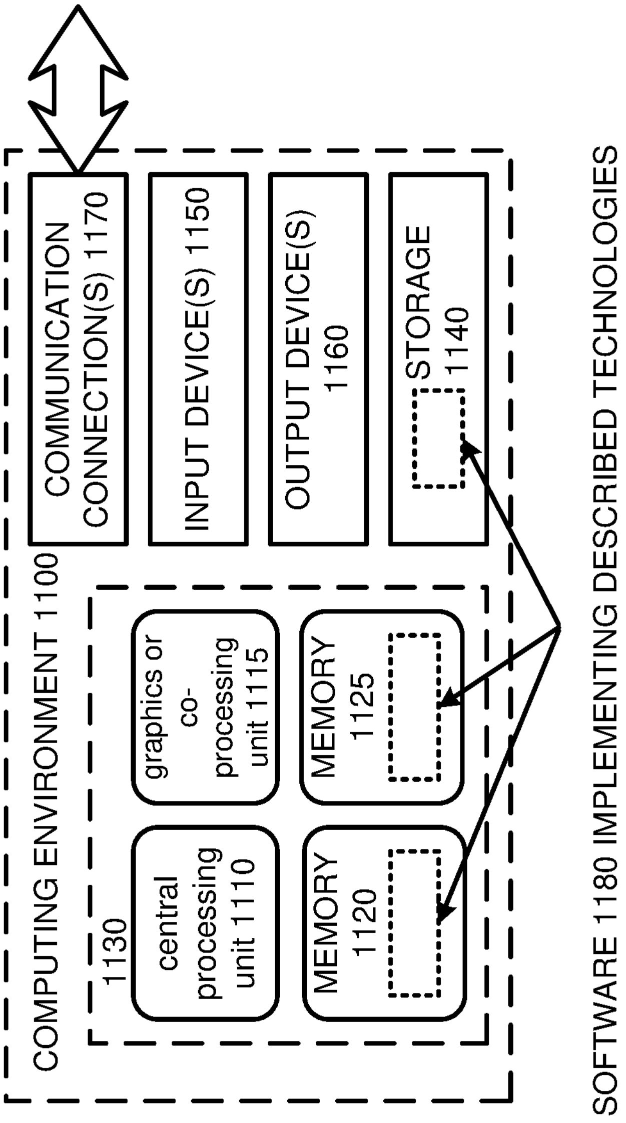
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing a database environment, and associated methods, described in Examples 1-6. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way, and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 12:
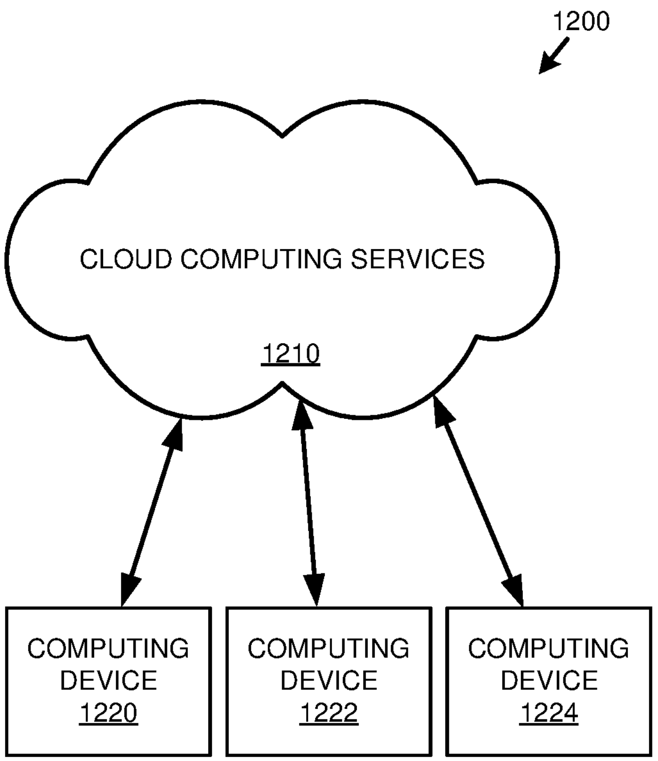
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

one or more hardware processor units coupled to the at least one memory; and one or more computer readable storage media storing computer-executable instructions that, when executed, cause the computing system to perform operations comprising:

at a shared edge agent shared by a plurality of edge device, over first respective network connections and using respective communication protocols, receiving data from the plurality of edge devices, the data for a given edge device of the plurality of edge devices comprising at least one reading from at least one hardware sensor in communication with the given edge device and an edge device identifier for the given edge device or a sensor identifier of a sensor associated with the given edge device;

at the shared edge agent, for respective data for respective edge devices of the plurality of edge devices, identifying at least one respective data processing rule for performing at least one data enrichment or data processing operation using a respective edge device identifier or a respective sensor identifier for a respective edge device to provide respective identified rules;

at the shared edge agent, processing the respective data for the respective edge devices using the respective identified rules to provide processed edge device data; and sending the processed edge device data from the shared edge agent to a downstream computing system over a network connection using a communication protocol.

2. The computing system of claim 1, the operations further comprising:

according to the at least one respective data processing rule of a respective edge device, sending a query to an enterprise computing system for enrichment data; and combining the enrichment data with the at least one reading, or a value generated at least in part using the at least one reading, to provide the processed edge device data.

3. The computing system of claim 2, wherein the downstream computing system comprises a data fabric storing data received from the enterprise computing system, wherein the downstream computing system processes the processed edge device data along with data received from the enterprise computing system.

4. The computing system of claim 1, wherein processing the respective data for the respective edge devices comprises filtering data from a respective edge device according to a filter criterion.

5. The computing system of claim 4, wherein the filter criterion comprises determining that the at least one reading from a given edge device does not satisfy a threshold.

6. The computing system of claim 1, wherein the processing the respective data for the respective edge devices comprises one or more data cleansing operations.

7. The computing system of claim 6, wherein the processing the respective data for the respective edge devices comprises enriching the at least one reading, or at least one value derived at least in part therefrom, with master data or governance data.

8. The computing system of claim 6, wherein the operations are performed by the share edge agent, and the shared edge agent receives the master data or governance data in a communication from an enterprise computing system.

9. The computing system of claim 8, the operations further comprising:

receiving an identifier of a respective edge device and a set of one or more attributes whose values are to be used to enrich the respective data for the respective edge device;

retrieving values for at least a portion of the set of one or more attributes from the enterprise computing system using the identifier for the respective edge device or an identifier of the at least one hardware sensor of the respective edge device; and storing the retrieved values, wherein the processing the respective data for the respective edge devices comprises enriching data from the respective edge device with at least a portion of the retrieved values.

10. The computing system of claim 1, wherein processing the respective data for the respective edge devices comprises aggregating multiple readings for one or more sensors of one or more respective edge devices.

11. The computing system of claim 1, wherein processing the respective data for the respective devices comprises adding attribute values for a set of one or more attributes defined for a given respective edge device, and wherein the set of one or more attributes is selected based on an edge device identifier comprised within the data for a given edge device.

12. The computing system of claim 11, the operations further comprising:

issuing a query to values of the set of one or more attributes, wherein the query comprises the respective edge device identifier as a selection criterion.

13. The computing system of claim 1, wherein the operations are performed by the shared edge agent and the downstream computing system receives processed edge device data from multiple shared edge agents of multiple edge nodes.

14. The computing system of claim 1, wherein the sending the processed edge device data to the downstream computing system is carried out according to a schedule.

15. The computing system of claim 1, the operations further comprising:

receiving configuration information, the configuration information specifying at least one edge device of the plurality of edge devices, or a respective hardware sensor thereof, and connection information for a data source from which enrichment data used in the processing the respective data for the at least one edge device should be retrieved.

16. The computing system of claim 15, wherein the configuration information comprises an identifier for the data source and authentication information, wherein the authentication information is provided to the data source in retrieving the enrichment data.

17. A method, implemented in a computing system comprising at least one memory and at least one hardware processor coupled to the at least one memory, the method comprising:

at a shared edge agent shared by a plurality of edge devised, over first respective network connections and using respective communication protocols, receiving data from the plurality of edge devices, the data for a given edge device of the plurality of edge devices comprising at least one reading from at least one hardware sensor in communication with the given edge device and an edge device identifier for the given edge device or a sensor identifier of a sensor associated with the given edge device;

at the shared edge agent, for respective data for respective edge devices of the plurality of edge devices, identifying at least one respective data processing rule for performing at least one data enrichment or data processing operation using a respective edge device identifier or a respective sensor identifier for a respective edge device to provide respective identified rules;

at the shared edge agent, processing the respective data for the respective edge devices using the respective identified rules to provide processed edge device data; and sending the processed edge device data from the shared edge agent to a downstream computing system over a network connection using a communication protocol.

18. The method of claim 17, further comprising:

according to the at least one respective data processing rule of a respective edge device, sending a query to an enterprise computing system for enrichment data; and combining the enrichment data with the at least one reading, or a value generated at least in part using the at least one reading, to provide the processed edge device data.

19. One or more non-transitory computer-readable storage media comprising:

computer-executable instructions that, when executed by a computing system comprising at least one hardware processor and at least one memory coupled to the at least one hardware processor, cause the computing system to, at a shared edge agent shared by a plurality of edge devices, over first respective network connections and using respective communication protocols, receive data from the plurality of edge devices, the data for a given edge device of the plurality of edge devices comprising at least one reading from at least one hardware sensor in communication with the given edge device and an edge device identifier for the given edge device or a sensor identifier of a sensor associated with the given edge device;

computer-executable instructions that, when executed by the computing system, cause the computing system to, at the shared edge agent, for respective data for respective edge devices of the plurality of edge devices, identify at least one respective data processing rule for performing at least one data enrichment or data processing operation using a respective edge device identifier or a respective sensor identifier for a respective edge device to provide respective identified rules;

computer-executable instructions that, when executed by the computing system, cause the computing system to, at the shared edge agent, process the respective data for the respective edge devices using the respective identified rules to provide processed edge device data; and computer-executable instructions that, when executed by the computing system, cause the computing system to send the processed edge device data from the shared edge agent to a downstream computing system over a network connection using a communication protocol.

20. The one or more non-transitory computer-readable storage media of claim 19, further comprising:

computer-executable instructions that, when executed by the computing system, cause the computing system to, according to the at least one respective data processing rule of a respective edge device, send a query to an enterprise computing system for enrichment data; and computer-executable instructions that, when executed by the computing system, cause the computing system to combine the enrichment data with the at least one reading, or a value generated at least in part using the at least one reading, to provide the processed edge device data.

* * * * *